(12) United States Patent
Guard et al.

(10) Patent No.: US 8,946,574 B2
(45) Date of Patent: Feb. 3, 2015

(54) TWO-LAYER SENSOR STACK

(75) Inventors: David Brent Guard, Hampshire (GB);
Esat Yilmaz, Santa Cruz, CA (US);
Tsung-Ching Wu, Saratoga, CA (US)

(73) Assignee: Atmel Corporation, San Jose, CA (US)

( * ) Notice: Subject to any disclaimer, the term of this patent is extended or adjusted under 35 U.S.C. 154(b) by 0 days.

(21) Appl. No.: 13/312,405

(22) Filed: Dec. 6, 2011

(65) Prior Publication Data

US 2012/0261242 A1 Oct. 18, 2012

Related U.S. Application Data

(63) Continuation of application No. 13/089,061, filed on Apr. 18, 2011, now Pat. No. 8,797,285.

(51) Int. Cl.
*H03K 17/96* (2006.01)
*G06F 3/044* (2006.01)

(52) U.S. Cl.
CPC ...... *G06F 3/044* (2013.01); *G06F 2203/04103* (2013.01); *G06F 2203/04112* (2013.01)
USPC .......................................... 200/181; 345/172

(58) Field of Classification Search
CPC .................. H01H 13/702; H01H 2239/006
See application file for complete search history.

(56) References Cited

U.S. PATENT DOCUMENTS

| | | | |
|---|---|---|---|
| 6,924,789 B2 * | 8/2005 | Bick | 345/168 |
| 7,382,139 B2 | 6/2008 | Mackey | |
| 7,663,607 B2 | 2/2010 | Hotelling | |
| 7,864,503 B2 | 1/2011 | Chang | |
| 7,875,814 B2 | 1/2011 | Chen | |
| 7,920,129 B2 | 4/2011 | Hotelling | |
| 8,031,094 B2 | 10/2011 | Hotelling | |
| 8,031,174 B2 | 10/2011 | Hamblin | |
| 8,040,326 B2 | 10/2011 | Hotelling | |
| 8,049,732 B2 | 11/2011 | Hotelling | |
| 8,179,381 B2 | 5/2012 | Frey | |
| 8,217,902 B2 | 7/2012 | Chang | |
| 8,355,006 B2 | 1/2013 | Park et al. | |
| 8,456,444 B2 | 6/2013 | Ishizaki et al. | |
| 8,723,824 B2 | 5/2014 | Myers | |
| 8,797,285 B2 | 8/2014 | Guard et al. | |
| 2002/0167619 A1 | 11/2002 | Bietsch et al. | |
| 2004/0239650 A1 | 12/2004 | Mackey | |
| 2006/0097991 A1 | 5/2006 | Hotelling et al. | |
| 2008/0158183 A1 * | 7/2008 | Hotelling et al. | 345/173 |
| 2008/0309635 A1 | 12/2008 | Matsuo | |
| 2009/0205879 A1 | 8/2009 | Halsey, IV et al. | |

(Continued)

FOREIGN PATENT DOCUMENTS

WO WO 2012/129247 9/2012

OTHER PUBLICATIONS

U.S. Appl. No. 61/454,936, filed Mar. 21, 2011, Myers.

(Continued)

*Primary Examiner* — Renee Luebke
*Assistant Examiner* — Ahmed Saeed
(74) *Attorney, Agent, or Firm* — Baker Botts LLP (57) ABSTRACT

In one embodiment, an method apparatus includes an optically clear adhesive (OCA) layer between a cover sheet and a substrate. The substrate has drive or sense electrodes of a touch sensor disposed on a first surface and a second surface of the substrate. The first surface is opposite the second surface and the drive or sense electrodes are made of a conductive mesh of conductive material including metal.

15 Claims, 9 Drawing Sheets

(56) References Cited

U.S. PATENT DOCUMENTS

| | | |
|---|---|---|
| 2009/0219257 A1* | 9/2009 | Frey et al. .................... 345/173 |
| 2009/0273570 A1 | 11/2009 | Degner et al. |
| 2009/0315854 A1 | 12/2009 | Matsuo |
| 2010/0045614 A1 | 2/2010 | Gray et al. |
| 2010/0045615 A1 | 2/2010 | Gray et al. |
| 2010/0045632 A1 | 2/2010 | Yilmaz et al. |
| 2010/0302201 A1 | 12/2010 | Ritter et al. |
| 2011/0007020 A1 | 1/2011 | Hong et al. |
| 2011/0310033 A1 | 12/2011 | Liu et al. |
| 2011/0310037 A1 | 12/2011 | Moran et al. |
| 2012/0075238 A1 | 3/2012 | Minami et al. |
| 2012/0242588 A1 | 9/2012 | Myers |
| 2012/0242592 A1 | 9/2012 | Rothkopf |
| 2012/0243151 A1 | 9/2012 | Lynch |
| 2012/0243719 A1 | 9/2012 | Franklin |
| 2012/0262382 A1 | 10/2012 | Guard et al. |
| 2012/0262412 A1 | 10/2012 | Guard et al. |
| 2013/0076612 A1 | 3/2013 | Myers |
| 2013/0127772 A1 | 5/2013 | Guard et al. |
| 2013/0234974 A1 | 9/2013 | Guard |

OTHER PUBLICATIONS

U.S. Appl. No. 61/454,950, filed Mar. 21, 2011, Lynch.
U.S. Appl. No. 61/454,894, filed Mar. 21, 2011, Rothkopf.
Guard et al., U.S. Appl. No. 13/089,061, Non-final Office Action, Nov. 23, 2012.
Guard et al., U.S. Appl. No. 13/089,061, Response to Non-final Office Action, Mar. 25, 2013.
Guard et al., U.S. Appl. No. 13/089,061, Non-final Office Action, Jun. 20, 2013.
Guard et al., U.S. Appl. No. 13/089,061, Response to Non-final Office Action, Dec. 17, 2013.
Guard et al., U.S. Appl. No. 13/331,022, Non-final Office Action, Oct. 7, 2013.
Guard et al., U.S. Appl. No. 13/331,022, Response to Non-final Office Action, Jan. 7, 2014.
Guard et al., U.S. Appl. No. 13/347,859, Non-final Office Action, Nov. 2, 2012.
Guard et al., U.S. Appl. No. 13/347,859, Response to Non-final Office Action, Mar. 4, 2013.
Guard et al., U.S. Appl. No. 13/347,859, Final Office Action, May 21, 2013.
Guard et al., U.S. Appl. No. 13/347,859, RCE and Response, Sep. 20, 2013.
Guard et al., U.S. Appl. No. 13/347,859, Non-Final Office Action, Nov. 1, 2013.
Guard, U.S. Appl. No. 13/413,306, Non-final Office Action, Oct. 8, 2013.
Guard, U.S. Appl. No. 13/413,306, Response to Non-final Office Action, Jan. 8, 2014.
Guard et al., U.S. Appl. No. 13/312,405 Notice of Allowance dated Mar. 27, 2014.
Guard et al., U.S. Appl. No. 13/312,405 Issue Notification dated Jul. 16, 2014.
Guard et al., U.S. Appl. No. 13/331,022 Final Office Action dated Apr. 15, 2014.
Guard et al., U.S. Appl. No. 13/331,022 Request for Continued Examination dated Jul. 15, 2014.
Guard et al., U.S. Appl. No. 13/347,859 Appeal Brief dated Mar. 28, 2014.
Guard et al., U.S. Appl. No. 13/347,859 Examiner's Answer dated Jul. 17, 2014.
Guard et al., U.S. Appl. No. 13/413,306 Final Office Action dated Apr. 11, 2014.
Guard et al., U.S. Appl. No. 13/413,306 Request for Continued Examination dated Jul. 11, 2014.
Guard et al., U.S. Appl. No. 13/347,859, Notice of Appeal, Jan. 31, 2014.
Guard et al., U.S. Appl. No. 13/347,859, Applicant-Initiated Interview Summary, Feb. 6, 2014.
Guard et al., U.S. Appl. No. 13/347,859, Applicant Summary of Interview with Examiner, Mar. 10, 2014.

* cited by examiner

TWO-LAYER SENSOR STACK

RELATED APPLICATION

This application is a continuation under 35 U.S.C. §120 of U.S. patent application Ser. No. 13/089,061, filed 18 Apr. 2011.

TECHNICAL FIELD

This disclosure generally relates to touch sensors.

BACKGROUND

A position sensor can detect the presence and location of a touch by a finger or by an object, such as a stylus, within an area of an external interface of the position sensor. In a touch sensitive display application, the position sensor enables, in some circumstances, direct interaction with information displayed on the screen, rather than indirectly via a mouse or touchpad. Position sensors can be attached to or provided as part of devices with a display. Examples of devices with displays include, but are not limited to, computers, personal digital assistants, satellite navigation devices, mobile telephones, portable media players, portable game consoles, public information kiosks, and point of sale systems. Position sensors have also been used as control panels on various appliances.

There are a number of different types of position sensors. Examples include, but are not limited to resistive touch screens, surface acoustic wave touch screens, capacitive touch screens, and the like. A capacitive touch screen, for example, may include an insulator coated with a transparent conductor in a particular pattern. When an object, such as a finger or a stylus, touches the surface of the screen there may be a change in capacitance. This change in capacitance may be sent to a controller for processing to determine where the touch occurred on the touch screen.

In a mutual capacitance configuration, for example, an array of conductive drive electrodes or lines and conductive sense electrodes or lines can be used to form a touch screen having capacitive nodes. A node may be formed where a drive electrode and a sense electrode overlap. The electrodes may be separated by an insulator to avoid electrical contact. The sense electrodes may be capacitively coupled with the drive electrodes at the nodes. A pulsed or alternating voltage applied on a drive electrode may therefore induce a charge on the sense electrodes that overlap with the drive electrode. The amount of induced charge may be susceptible to external influence, such as from the proximity of a nearby finger. When an object touches the surface of the screen, the capacitance change at each node on the grid can be measured to determine the position of the touch.

While clear conductors such as ITO may be used for electrodes, opaque metal electrodes also may be used. The opaque metal electrodes may be made of a conductive mesh of thin conductors, which may be of copper, silver or other conductive materials. The thin conductors may be made very thin as to be substantially invisible to the naked eye.

SUMMARY

An electrode pattern for a position sensing panel may have an array of mesh cells formed by sinusoidaly shaped conductive lines extending between vertices of the mesh cells.

BRIEF DESCRIPTION OF THE FIGURES

The figures depict one or more implementations in accordance with the present disclosure, by way of example, not by way of limitation. In the figures, like reference numerals refer to the same or similar elements.

DETAILED DESCRIPTION

In the following detailed description, numerous specific details are set forth by way of examples. In order to avoid unnecessarily obscuring examples of the present disclosure, those methods, procedures, components, and/or circuitry that are well-known to one of ordinary skill in the art have been described at a relatively high level.

Reference is now made in detail to the examples illustrated in the accompanying figures and discussed below.

A display may be overlaid with a touch position-sensing panel to implement a touch sensitive display device. Exemplary displays include liquid crystal displays, active matrix liquid crystal displays, electroluminescent displays, electrophoretic displays, plasma displays, cathode-ray displays, OLED displays, or the like. It will be appreciated that light emitted from the display may be able to pass through the touch position-sensing panel with minimal absorption or obstruction.

Figure 1:
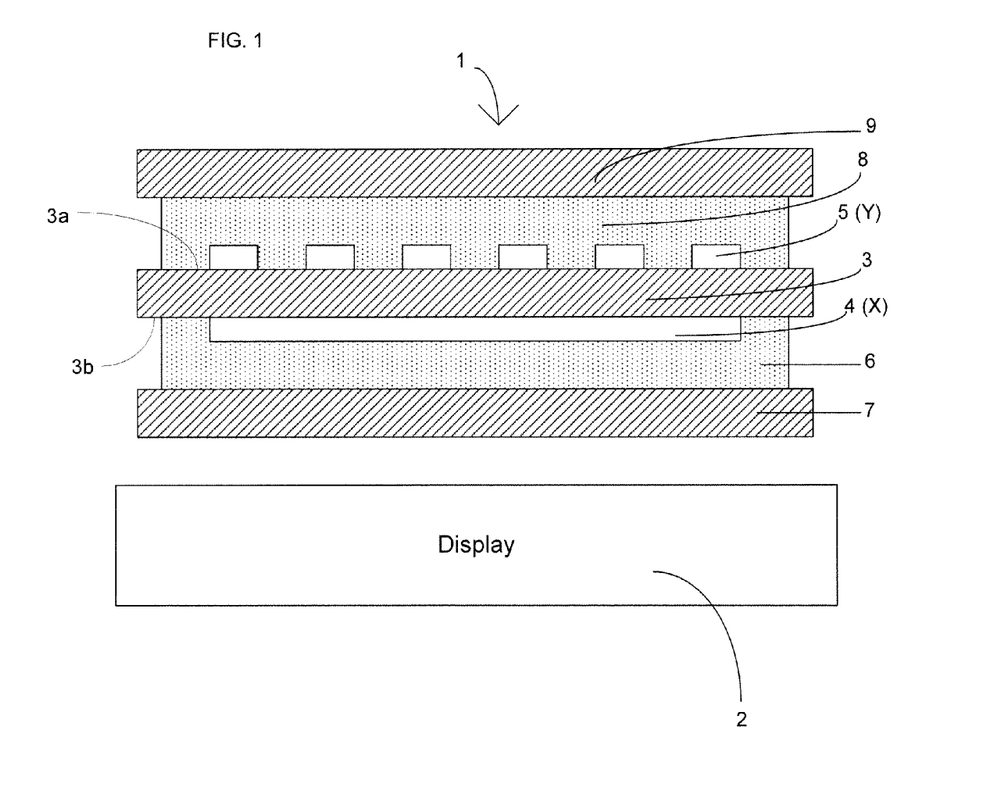
FIG. 1 is a cross-sectional view of an exemplary touch sensitive panel and a display.

FIG. 1 illustrates an exemplary touch position-sensing panel 1 which overlies a display 2. In the illustrated example, the panel 1 includes an insulating substrate 3 having two opposing faces. Although touch sensors may implement other types of touch sensing, for discussion purposes, the drawing shows an example of a structure that may be used to implement a mutual capacitance type touch sensitive panel.

The panel 1 includes a number of electrodes 4 (X) and a number of electrodes 5 (Y) provided on opposite faces 3a and 3b of the substrate 3. The electrodes 4 (X), which may be on face 3b, may be arranged in one direction and the electrodes 5 (Y), which may be on face 3a, may be arranged in a direction different than the direction of electrodes 4 (X). Other conductive tracks may also be provided on the opposing faces 3a and 3b of the substrate 3. Such other conductive tracks may provide drive and sense connections to the electrodes 4 (X)

and 5 (Y). The substrate 3 may be provided adjacent to the display 2 such that electrodes 4 (X) are arranged between the display 2 and the substrate 3. An adhesive layer 6 of an optically clear adhesive may be between the electrodes 4 (X) and a transparent covering sheet 7. Another adhesive layer 8 of an optically clear adhesive may be between the electrodes 5 (Y) and a transparent covering sheet 9. A gap may be formed between the display 2 and the transparent covering sheet 7.

The transparent covering sheet 7 and the adhesive layer 6 of optically clear adhesive may encapsulate the electrodes 4 (X), and any other conductive tracks formed on face 3b of the substrate 3. The transparent covering sheet 9 and the adhesive layer 8 of optically clear adhesive may encapsulate the electrodes 5 (Y), and any other conductive tracks formed on face 3a of the substrate 3. The encapsulation of the electrodes 4 (X) and 5 (Y), and any other conductive tracks, may provide protection from physical and environmental damage. In some examples, portions of the conductive tracks may be exposed to provide connection points for connection to external drive circuitry.

In the mutual capacitance example, electrodes 4 (X) may be drive electrodes provided on face 3b of the substrate 3, and electrodes 5 (Y) may be sense electrodes provided on the opposing face 3a of the substrate 3. Capacitive sensing channels may be formed by capacitive coupling nodes in the localized regions at an around where electrodes 4 (X) and 5 (Y) cross over each other and are separated by the substrate 3.

One or both of the sets of electrodes 4 (X) and 5 (Y) may be formed from a conductive material, such as a metal. Suitable metals include copper, silver, gold, aluminum, tin and other metals used in conductive wiring. In some examples, the sense electrodes may be patterned in narrow lines to allow most of the light emitted from the display and incident on the sense electrode layer to pass through the electrode layer between the narrow metal lines. The narrow lines may be no more than 20 microns wide. An exemplary range may be 1-5 microns. Narrower lines have reduced visibility to the naked eye. By forming electrodes 4 (X) or 5 (Y) from narrow conductive lines, the position-sensing panel may be formed such that no more than about 10% of the active area is covered by the metal lines of the electrodes. Less coverage of the active area allows for greater transparency of the position-sensing panel reduces visibility of the electrodes to the human eye and reduces perceptible darkening or other loss of display quality. An exemplary coverage may be less than 5%.

In some examples, the electrodes 4 (X) may be formed from a clear conductive material and the electrodes 5 (Y) may be formed from narrow conductive lines. In other examples, the electrodes 4 (X) may be formed from narrow conductive lines and the electrodes 5 (Y) may be formed from a clear conductive material.

In an example where other conductive tracks in addition to the electrodes 4 (X) and 5 (Y) are provided on the substrate 3, the other conductive tracks may also be formed from a clear conductive material or narrow conductive lines, in a manner similar to the electrode layers 4 (X) and 5 (Y). In an example where the other conductive tracks, or parts of the other conductive tracks, lie outside a visible region of the display 2, the light-transmissibility of the other conductive tracks is of no concern.

Figure 2A:
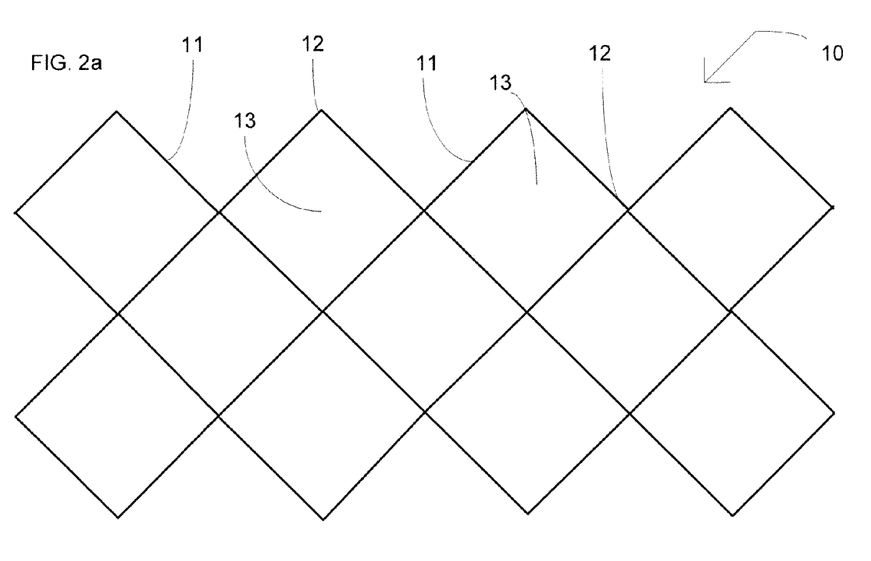
FIGS. 2a-b illustrate schematically exemplary electrode patterns useable in the touch sensitive panel of FIG. 1.

FIG. 2a illustrates an exemplary electrode pattern 10 which may be used in the touch position-sensing panel 1. The exemplary electrode pattern may be used to form any one electrode of either set of the electrodes 4 (X) and 5 (Y). The electrode pattern 10 may be formed by a number of straight conductive lines 11 arranged to interconnect at connection points to define a conductive grid or mesh pattern made up of an array of square shaped mesh cells 13 arranged in a layer. The connection points of the conductive lines 11 are the vertices 12 of the square shaped mesh cells 13. The conductive lines may be formed of copper with a width in the range approximately 1 µm to approximately 10 µm and size of the mesh pattern, that is, the spacing of the vertices, may be in the range approximately 500 µm to approximately 10 mm. In one example, the electrode pattern 10 may be arranged so that no more than approximately 5% of the surface of the touch position-sensing panel is covered by the conductive lines 11. Thus, the contribution of the conductive lines to the attenuation of light through a sensor should not be more than approximately 5%. Accordingly, although the conductive lines 11 may be opaque, in this example, the combined optical transmissivity of the electrode pattern 10 and all other electrode patterns on the panel may be 90% or more, allowing any display below the touch position-sensing panel 1 to be visible with little perceptible darkening or other loss of display quality.

Figure 2B:
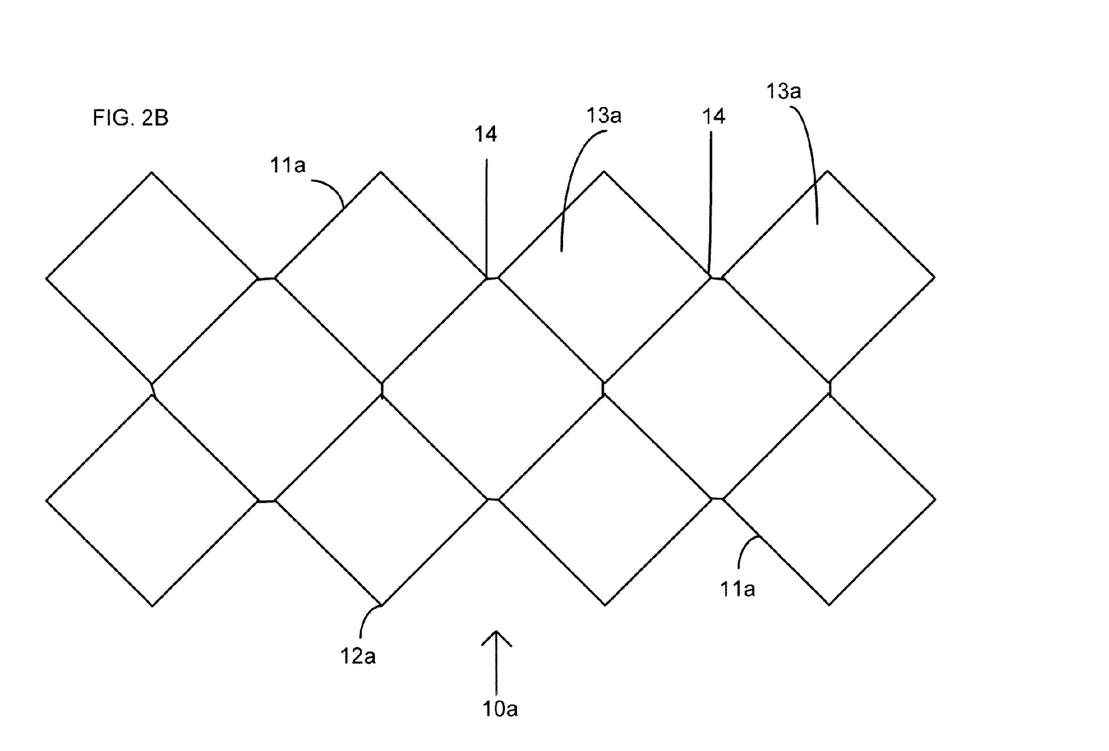

In other examples, the electrode pattern may be formed by a number of square shaped mesh cells 13a that do not have four metal lines meet at vertices. Instead of the connection points of the conductive lines being the vertices of the square shaped mesh cells as shown in FIG. 2a, in FIG. 2b, each of the square shaped mesh cells 13a may be separated from adjacent cells by a connecting segment 14. This arrangement may result in reduced line density on the vertices 12 by reducing the number of converging metal lines 11a from 4 to 3. While the connecting segments 14 in FIG. 2b are straight, in other examples, the connecting segments may be sinusoidal or non-linear, and may be at any angle relative to the vertices 12a.

Figure 3A:
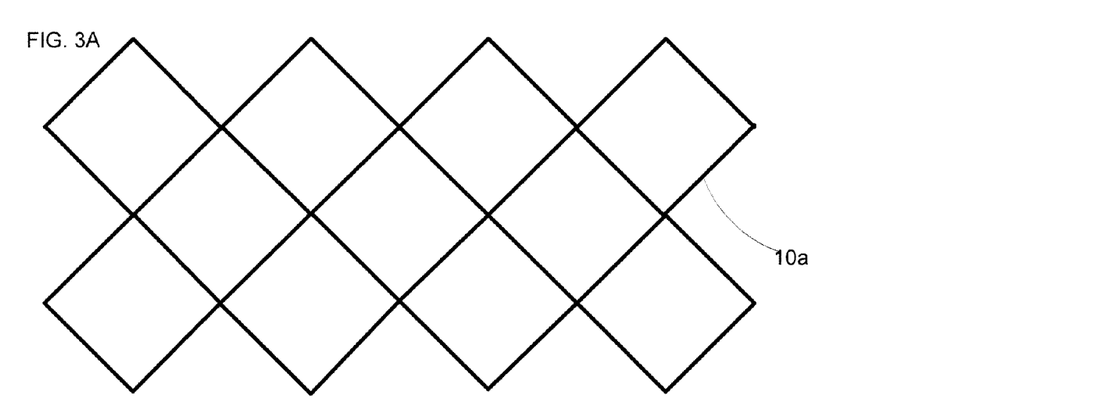
FIGS. 3A-3C illustrate schematically an arrangement of two of the electrode patterns of FIG. 2a overlying one another.
Figure 3B:
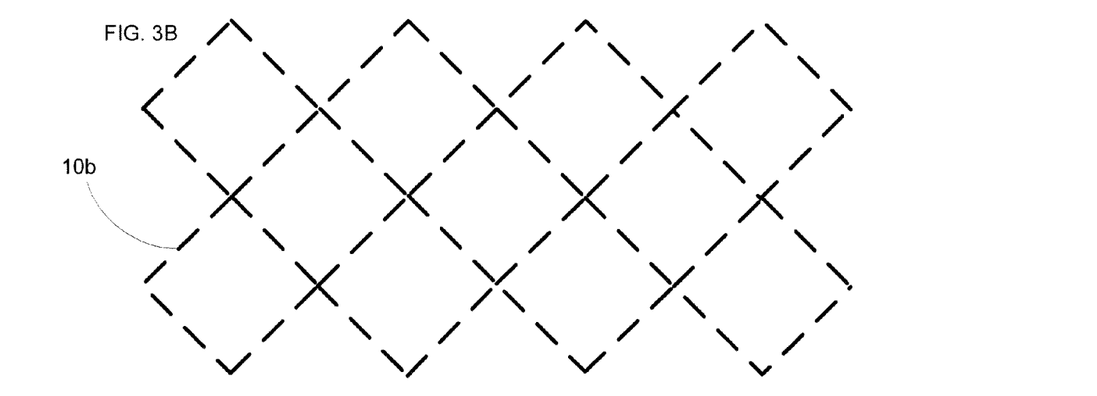
Figure 3C:
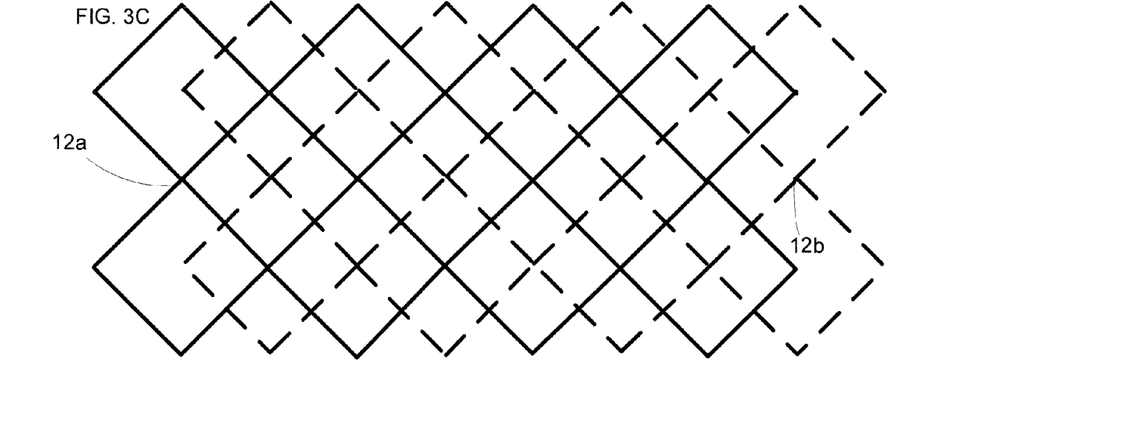

FIGS. 3A-3C illustrate an example of electrode patterns 10a and 10b formed so that the two electrode patterns 10a and 10b overlay one another. The two electrode patterns 10a and 10b may be offset so that the vertices 12a, 12b of each one of the electrode patterns 10a and 10b are located at, or near to, the centers of the square shapes 13a, 13b of the other one of the electrode patterns 10a and 10b. As a result of this offsetting of the two electrode patterns 10a and 10b, the conductive lines 11a and 11b of the two electrode patterns 10a and 10b may be distributed evenly across the touch position-sensing panel 1.

In other examples, the mesh pattern may be made up of an array of other regular trapezoid shaped mesh cells. In one example, the mesh pattern may be made up of an array of two different diamond shaped mesh cells which tessellate to form the mesh pattern.

Figure 4:
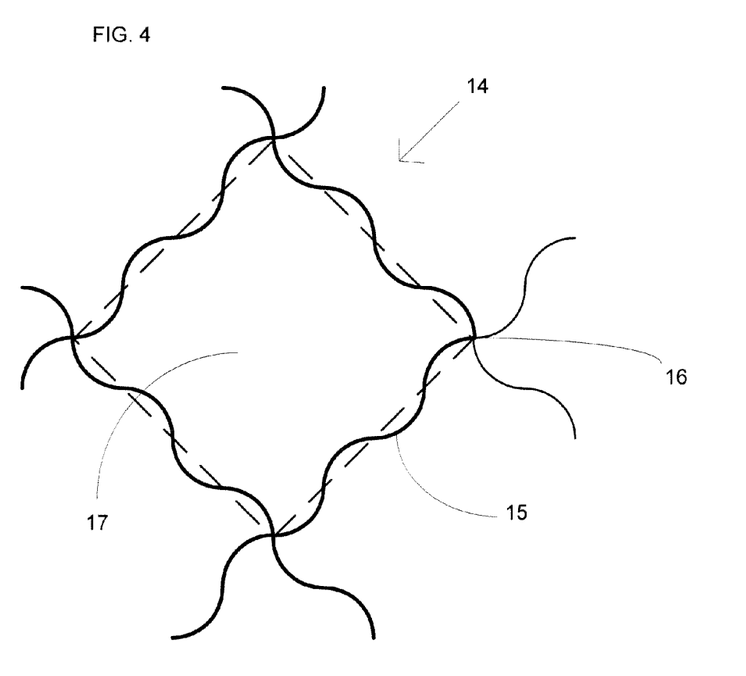
FIG. 4 illustrates schematically another electrode pattern useable in the touch sensitive panel of FIG. 1.

An example of a portion of an electrode pattern 14 is shown in FIG. 4. In this illustrated example, the electrode pattern 14 may be formed of conductive lines 15 arranged to interconnect at connection points to define a conductive grid or mesh pattern made up of an array of substantially square shaped mesh cells 17 arranged in a layer. The connection points of the conductive lines 15 form vertices 16 of the square shaped mesh cells 17. In FIG. 4, a single substantially square shaped mesh cell 17 is shown together with parts of the conductive lines 15 defining adjacent substantially square shaped mesh cells 17.

In the illustrated example of FIG. 4, the conductive lines 15 extending between the vertices 16 are not straight. As can be seen in the illustrated example, each of the conductive lines 15 may have a sinusoidal shape. Each conductive metal line 15 may be arranged as a sinusoidal line centered on a path that would be taken by a straight line between the vertices 16 linked by the conductive metal line 15. Thus, comparing the examples illustrated in FIG. 2 and FIG. 4, each sinusoidal conductive metal line 15 illustrated in FIG. 4 may be centered about, and may extend to either side of, one of the straight conductive lines 11 illustrated in FIG. 2, shown as dotted lines in FIG. 4. The mesh cells 17 shown in FIG. 4 may be described as substantially square because, although the vertices 16 are arranged in a square, the sinusoidal shape of the conductive lines 15 may result in mesh cells 17 that are substantially, but not precisely, square shaped.

The sinusoidal shape of the conductive lines 15 as shown in FIG. 4 may reduce diffraction effects which may be encountered if straight conductive lines are used. Such diffraction effects may result in the appearance of "starburst" patterns when a touch position-sensing panel is subject to bright ambient light. Such diffraction effects may result in color shifting, changing the apparent colors of liquid crystal display (LCD) elements of a display visible through a touch position-sensing panel, and may obscure the image being displayed.

The sinusoidal shape of the conductive lines 15 in the illustrated example may reduce the visibility of reflections from the conductive lines when a touch position sensing panel is illuminated by light from a point illumination source, such as the sun on a clear day. The sinusoidal shape of the conductive lines 15 may tend to distribute or disperse the apparent position on the touch position sensing panel of such reflections, and so may minimize the perceived visibility of repetitive reflection patterns. Such repetitive reflection patterns are readily perceived by the human eye.

In FIG. 4, each sinusoidal conductive metal line makes two complete sinusoidal cycles between two vertices 16. In other examples, each sinusoidal conductive line may make a different number of cycles between two vertices 16.

In some examples, the sinusoidal conductive lines may be formed as continuous curves. In other examples, the sinusoidal conductive lines may be formed by a number of short straight line sections arranged in a triangular waveform shape to approximate a sinusoidal shape. In other examples, the conductive lines may be shaped as other types of curves. In some examples, the conductive lines may be shaped as curves extending from a path that would be taken by a straight line between the vertices linked by the conductive metal line.

Figure 5:
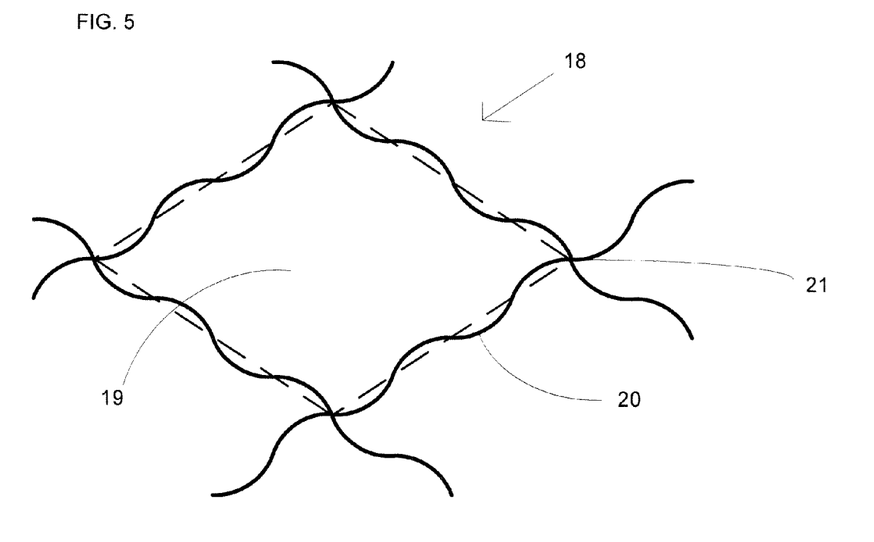
FIG. 5 illustrates schematically another electrode pattern useable in the touch sensitive panel of FIG. 1.

Another example of an electrode pattern 18 is shown in FIG. 5. In this example, the electrode pattern 18 may be formed by conductive lines 20 arranged to interconnect at connection points to define a conductive grid or mesh pattern made up of an array of substantially diamond shaped mesh cells 19 arranged in a layer. The connection points of the conductive lines 20 form vertices 21 of the diamond shaped mesh cells 19. In FIG. 5 a single substantially diamond shaped mesh cell 19 is shown, together with parts of the conductive lines 20 defining adjacent ones of the substantially diamond shaped mesh cells 19. The mesh cells 19 in FIG. 5 may be substantially diamond shaped. For example, although the vertices 21 are arranged in a diamond, the sinusoidal shape of the conductive lines 20 may result in mesh cells 19 that are substantially diamond shaped, varying from a straight line, as shown by the dotted lines.

In other examples, the mesh pattern may be made up of an array of other substantially regular trapezoid shaped mesh cells. In one example, the mesh pattern may be made up of a tessellated array of two different substantially diamond shaped mesh cells.

In other examples, the amplitude of the sinusoidal shape of the sinusoidal conductive lines may be varied. For example, the distance the peaks of the sinusoidal shaped conductive lines extend away from a path that would be taken by a straight line between the vertices linked by the sinusoidal conductive lines may be varied. The amplitude of the sinusoidal shape of the sinusoidal conductive lines may be varied between the different sinusoidal conductive lines, and may also be varied at different points along one, some or all of the sinusoidal conductive lines.

Figure 6:
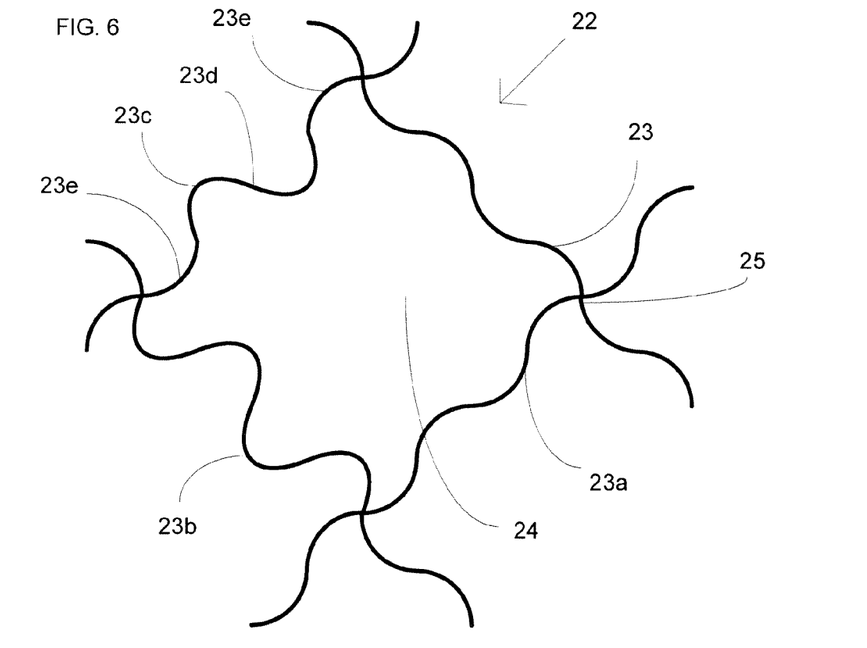
FIG. 6 illustrates schematically another electrode pattern useable in the touch sensitive panel of FIG. 1.

A portion of another electrode pattern 22 is shown in FIG. 6. In this example, the electrode pattern 22 may be formed by conductive lines 23 arranged to interconnect at connection points to define a conductive grid or mesh pattern made up of an array of substantially square shaped mesh cells 24 arranged in a layer. The connection points of the conductive lines 23 form vertices 25 of the corners of the mesh cell 24. In FIG. 6, a single mesh cell 24 is shown, together with parts of the conductive lines 23 defining adjacent mesh cells 24. Although the vertices 25 may be arranged at the corners of the mesh cell to form a square shape, the sinusoidal shape of the conductive lines 23 may vary from a straight line and results in mesh cells 24 that may be substantially square.

For example, as shown in FIG. 6, the conductive lines 23 extending between the vertices 25 may have a sinusoidal shape similar to the example illustrated in FIG. 4. Each conductive metal line 23 may be arranged as a sinusoidal line centered on a path that would be taken by a straight line between the vertices 25 linked by the sinusoidal conductive metal line 23.

In FIG. 6, the sinusoidal conductive lines 23 may have varying amplitudes. For example, sinusoidal conductive metal line 23a and sinusoidal conductive metal line 23b may have different amplitudes. The conductive metal line 23a may have a smaller amplitude than the sinusoidal conductive metal line 23b. Further, a sinusoidal conductive metal line 23c may have sections 23d and 23e with different amplitudes. The section 23d of the sinusoidal conductive metal line 23c may have a larger amplitude than the sections 23e of the sinusoidal conductive metal line 23c.

As shown, the sinusoidal conductive lines in FIG. 6 may have two different amplitudes. In other examples, the sinusoidal conductive lines may have other number of different amplitudes.

In an example of an electrode using the cell of FIG. 6, the mesh pattern may be made up of an array of substantially square shaped mesh cells, such as an array of other substantially regular trapezoid shaped mesh cells. In another example, the mesh pattern may be made up of an array of substantially diamond shaped mesh cells. In one example, the mesh pattern may be made up of a tessellated array of two different substantially diamond shaped mesh cells.

In other examples, the wavelength of the sinusoidal shape of the sinusoidal conductive lines may be varied. That is, the distance between the crossing points where the sinusoidal shaped conductive lines cross a path that would be taken by a straight line between the vertices linked by the sinusoidal conductive lines may be varied. The wavelength of the sinusoidal shape of the sinusoidal conductive lines may be varied between the different sinusoidal conductive lines and/or may be varied at different points along one, some or all of the sinusoidal conductive lines.

Figure 7:
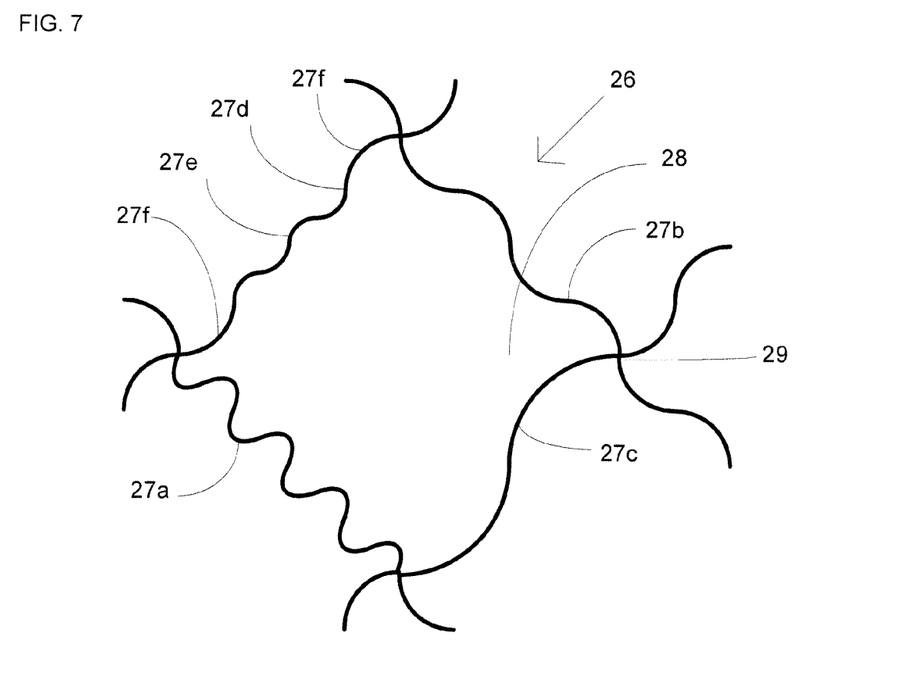
FIG. 7 illustrates schematically another electrode pattern useable in the touch sensitive panel of FIG. 1.

A portion of another electrode pattern 26 is shown in FIG. 7. In this example, the electrode pattern 26 may be formed by conductive lines 27 arranged to interconnect at connection points to define a conductive grid or mesh pattern made up of an array of substantially square shaped mesh cells 28 arranged in a layer, similar to the electrode pattern 14 illustrated in FIG. 4. The connection points of the conductive lines 27 form vertices 29 of the square shaped mesh cells 28. In FIG. 7, a single substantially square shaped mesh cell 28 is shown, together with parts of the conductive lines 27 defining adjacent substantially square shaped mesh cells 28.

As shown in FIG. 7, the conductive lines 27 extending between the vertices 29 may have a sinusoidal shape. Each conductive metal line 27 may be arranged as a sinusoidal line centered on a path that would be taken by a straight line between the vertices 29 linked by the sinusoidal conductive metal line 27.

In this example, the sinusoidal conductive lines 27 may have varying wavelengths. As is illustrated in FIG. 7, a sinusoidal conductive metal line 27a, a sinusoidal conductive metal line 27b, and a sinusoidal conductive metal line 27c may each have different wavelengths. The conductive metal line 27a may have a smaller wavelength than the sinusoidal conductive metal line 27b. In turn, the sinusoidal conductive metal line 27b may have a smaller wavelength than the sinusoidal conductive metal line 27c. Further, a sinusoidal conductive metal line 27d may have sections 27e and 27f with different wavelengths. The section 27e of the sinusoidal conductive metal line 27d may have a shorter wavelength than the sections 27f of the sinusoidal conductive metal line 27d.

As shown, the sinusoidal conductive lines of FIG. 7 may have three different wavelengths. In other examples, the sinusoidal conductive lines may have any number of different wavelengths.

In other examples, both the amplitude and the wavelength of the sinusoidal shape of the sinusoidal conductive lines may be varied. The amplitude and/or the wavelength of the sinusoidal shape of the sinusoidal conductive lines may be varied between the different sinusoidal conductive lines, and may also be varied at different points along one, some or all of the sinusoidal conductive lines.

Figure 8:
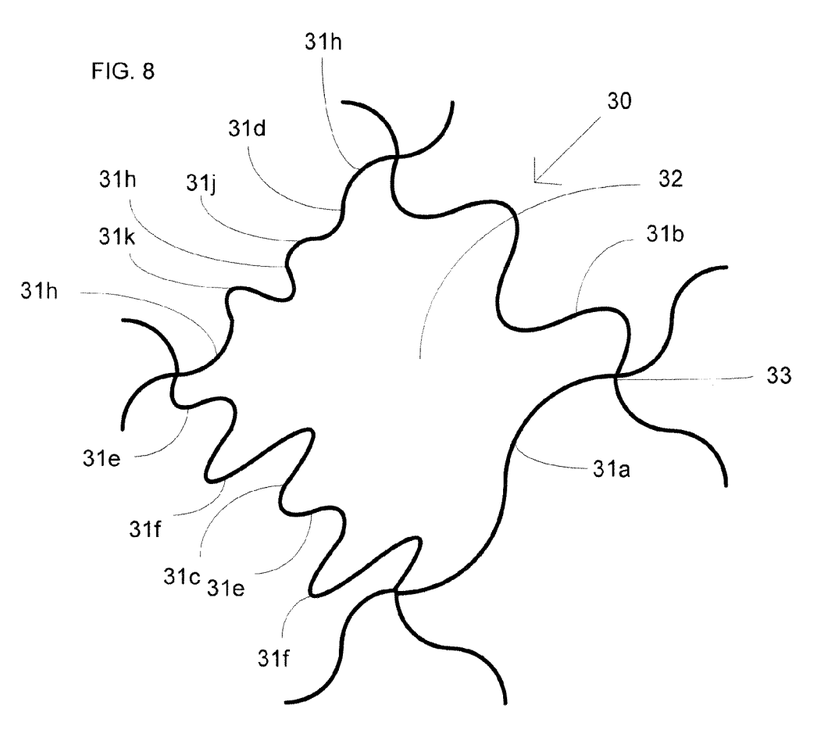
FIG. 8 illustrates schematically another electrode pattern useable in the touch sensitive panel of FIG. 1.

A portion of another electrode pattern 30 is shown in FIG. 8. In this example, the electrode pattern 30 may be formed by conductive lines 31 arranged to interconnect at connection points to define a conductive grid or mesh pattern made up of an array of substantially square shaped mesh cells 32 arranged in a layer. The connection points of the conductive lines 31 form vertices 33 of the square shaped mesh cells 32. In FIG. 8, a single substantially square shaped mesh cell 32 is shown, together with parts of the conductive lines 31 defining adjacent substantially square shaped mesh cells 32. The mesh cells 32 in the example shown in FIG. 8 may be substantially square.

In the example of FIG. 8, the conductive lines 31 extending between the vertices 33 have a varying sinusoidal shape. Each conductive metal line 31 may be arranged as an irregular sinusoidal line centered on a path that would be taken by a straight line between the vertices 33 linked by the sinusoidal conductive metal line 31.

In this example, the conductive lines 31 have varying amplitudes and varying wavelengths of the sinusoids. As is illustrated in FIG. 8, a sinusoidal conductive metal line 31a and a sinusoidal conductive metal line 31b have different amplitudes and wavelengths. The sinusoidal conductive metal line 31a may have a longer wavelength and a smaller amplitude than the sinusoidal conductive metal line 31b. A sinusoidal conductive metal line 31c may have a shorter wavelength than sinusoidal conductive metal line 31b. The sinusoidal conductive metal line 31c may have sections 31e and 31f with different amplitudes. The sections 31e of the sinusoidal conductive metal line 31c have a smaller amplitude than the sections 31f of the sinusoidal conductive metal line 31c. A sinusoidal conductive metal line 31d may have sections with different wavelengths and different amplitudes. The sinusoidal conductive metal line 31d may have sections 31g and 31h with different wavelengths. Section 31g of the sinusoidal conductive metal line 31d may have a shorter wavelength than section 31h of sinusoidal conductive metal line 31d. Further, section 31g of sinusoidal conductive metal line 31d may have sections 31j and 31k with different amplitudes. Section 31j may have a smaller amplitude than section 31k.

As shown, the sinusoidal conductive lines in FIG. 8 may have three different wavelengths and two different amplitudes. In other examples, the sinusoidal conductive lines may have other numbers of different wavelengths and other numbers of different amplitudes.

In other examples, a phase change between the sinusoidal shapes of the sinusoidal conductive lines where the sinusoidal conductive lines interconnect at connection points may be varied.

Figure 9:
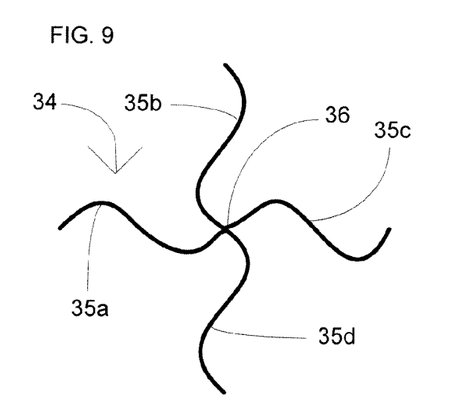
FIG. 9 illustrates schematically another electrode pattern useable in the touch sensitive panel of FIG. 1.

A portion of another electrode pattern 34 is shown in FIG. 9. For convenience, the drawing shows one vertex and two sinusoids, one on either side of the vertex, for the lines connect at the vertex. In this example, the electrode pattern 34 may be formed by sinusoidal conductive lines 35a to 35d arranged to interconnect at a connection point 36 to define a conductive grid or mesh pattern made up of an array of mesh cells. The connection point 36 of the sinusoidal conductive lines 35a to 35d form a vertex of four of the mesh cells. In FIG. 9, a single connection point 36 is shown, together with parts of the sinusoidal conductive lines 35a to 35d which interconnect at the connection point 36.

In the illustrated example, four sinusoidal conductive lines 35a to 35d and the connection point 36 of those four lines 35a to 35d may be part of an electrode pattern 34 defining an array of substantially square shaped mesh cells arranged in a layer. As discussed regarding the previous examples, the sinusoidal conductive lines may be sinusoidal shapes extending to either side of the path of a straight line extending between adjacent connection points or vertices of the electrode pattern 34. In the exemplary orientation, because the electrode pattern 34 may define an array of substantially square shaped mesh cells, a sinusoidal conductive metal line 35a and a sinusoidal conductive metal line 35c may extend to either side of the connection point 36 in one direction and may be aligned with one another. Similarly, a sinusoidal conductive metal line 35b and a sinusoidal conductive metal line 35d may extend to either side of the connection point 36 in another direction and may be aligned with one another. The sinusoidal metal lines 35a and 35c extend perpendicularly to the sinusoidal metal lines 35b and 35d.

In the example, the sinusoidal waveform of the conductive metal line 35a and the sinusoidal conductive metal line 35c may be in phase where the two conductive lines 35a and 35c meet at the connection point 36. Similarly, the sinusoidal waveform of the conductive metal line 35b and the sinusoidal waveform of the conductive metal line 35d may be in phase where the two conductive lines 35b and 35d meet at the connection point 36.

Figure 10:
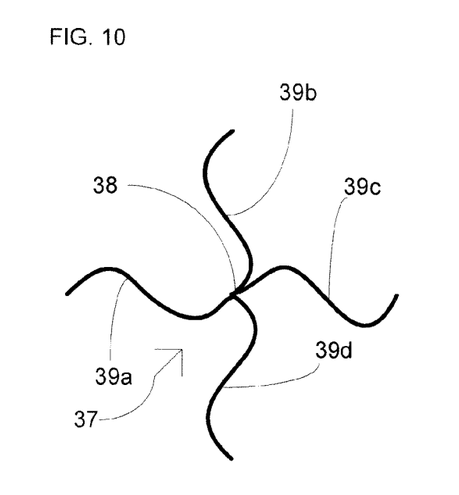
FIG. 10 illustrates schematically another electrode pattern useable in the touch sensitive panel of FIG. 1.

An example of a portion of another electrode pattern 37 is shown in FIG. 10. In this illustrated example, the electrode pattern 37 may be formed by a sinusoidal waveform of the conductive lines 39a to 39d arranged to interconnect at a connection point 38 to define a conductive grid or mesh pattern made up of an array of substantially square mesh cells. The connection point 38 of the sinusoidal waveform of the conductive lines 39a to 39d forms a vertex of four of the substantially square shaped mesh cells. In FIG. 10, a single connection point 38 is shown, together with parts of the conductive lines 39a to 39d which interconnect at the connection point 38.

In FIG. 10, four sinusoidal waveforms of the conductive lines 39a to 39d may be interconnected at the connection point 38. In the illustrated example, a sinusoidal waveform of the conductive metal line 39a and a sinusoidal waveform of the conductive metal line 39c may be in phase where the two conductive lines 39a and 39c meet at the connection point 38. In contrast, a sinusoidal waveform of the conductive metal line 39b and a sinusoidal waveform of the conductive metal line 39d may be in anti-phase, or 180° out of phase, where the two conductive lines 39b and 39d meet at the connection point 38.

In FIG. 9, the sinusoidal conductive lines may be arranged to be in phase where the sinusoidal conductive lines meet at connection points in the mesh pattern. In FIG. 10, the sinusoidal conductive lines 39a to 39d may be arranged to be in anti-phase where the sinusoidal conductive lines meet at some of the connection points 38 in the mesh pattern. In other examples, the sinusoidal conductive lines 39a to 39d may be arranged to be in anti-phase where the sinusoidal conductive lines meet at all of the connection points in the mesh pattern.

In other examples, the width of the conductive lines may be varied along their length.

Figure 11:
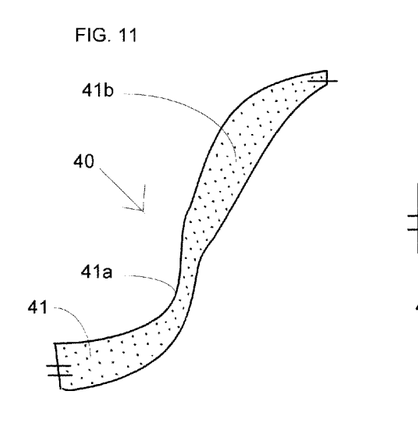
FIG. 11 illustrates schematically another electrode pattern useable in the touch sensitive panel of FIG. 1.

A portion of another electrode pattern 40 is shown in FIG. 11. In this example, the electrode pattern 40 may include a sinusoidal conductive metal line 41. The sinusoidal conductive metal line 41 may have narrow sections 41a and broader sections 41b. The sinusoidal conductive metal line 41 may have a tapering width between the narrow sections 41a and broader sections 41b. In other examples, the width can vary non-linearly along the length of the sinusoidal conductive metal line 41.

Figure 12:
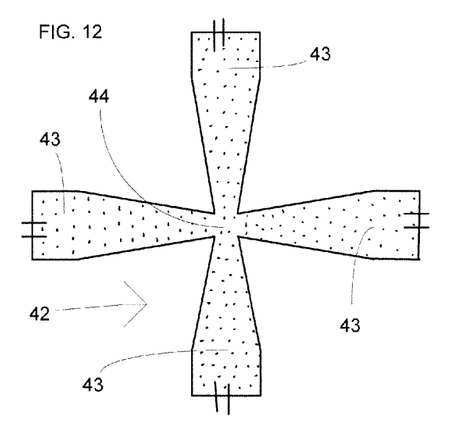
FIG. 12 illustrates schematically another electrode pattern useable in the touch sensitive panel of FIG. 1.

A portion of another electrode pattern 42 is shown in FIG. 12. In this illustrated example, the electrode pattern 42 may be formed by sinusoidal conductive lines 43 arranged to interconnect at a connection point 44 to define a conductive grid or mesh pattern made up of an array of mesh cells. The connection point 44 of the sinusoidal conductive lines 43 forms a vertex of four of the shapes. In FIG. 12, a single connection point 44 is shown, together with parts of the sinusoidal conductive lines 43 which interconnect at the connection point 44.

In FIG. 12, each of the four sinusoidal conductive lines 43 may be relatively narrow at the connection point 44, and relatively broad away from the connection point 44. Each of the sinusoidal conductive lines 43 may have a tapered section which widens in a direction extending away from the connection point 44.

The examples shown in FIG. 11 and FIG. 12 may be combined. For example, the sinusoidal conductive lines may vary in width along their length and may be relatively narrow where the sinusoidal conductive lines interconnect at a connection point.

In the examples of FIG. 11 and FIG. 12, the conductive lines may be sinusoidal conductive lines. In other examples, the conductive lines could have other geometries. In some examples, the conductive lines which vary in width along their length and/or the conductive lines which may be narrowed where the conductive lines interconnect could be straight conductive lines.

Figure 13:
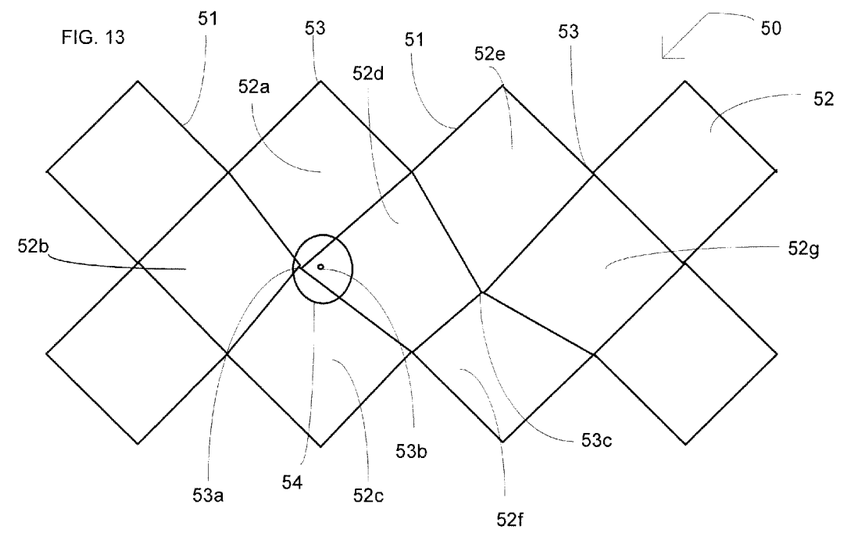
FIG. 13 illustrates schematically another electrode pattern useable in the touch sensitive panel of FIG. 1.

FIG. 13 illustrates a portion of an exemplary electrode pattern 50 which may be used in the touch position-sensing panel 1. The exemplary electrode pattern may be used to form either electrodes 4 (X) and 5 (Y). In the illustrated example, the electrode pattern 50 may be formed by a number of conductive lines 51 arranged to interconnect at connection points to define a conductive grid or mesh pattern made up of an array of mesh cells 52. The connection points of the conductive lines 51 may be the vertices 53 of the mesh cells 52. In the illustrated example, the pattern of the conductive lines 51 and mesh cells 52 may be determined by first arranging all of the vertices 53 of the mesh cells 52 in a regular square array. When the vertices 53 are in this square array, the mesh cells 52 may be square and the electrode pattern 50 may be similar to the illustrated example of FIG. 2.

The positions of some of the vertices 53 may vary. In the example, a vertex 53a may be a short distance to the left from the location 53b which would represent a regular square array. As is shown in FIG. 13, this position of the vertex 53a may result in distorted, non-square shapes of mesh cells 52a to 52d for which vertex 53a is a vertex. In one example, a vertex 53c may be a short distance downward and to the left from the location which the vertex 53c would have occupied in the regular square array. As is shown in FIG. 13, this displacement of the vertex 53c may further distort the shape of mesh cell 52d for which vertices 53a and 53c are both displaced away from positions corresponding to a square shape. The displacement of vertex 53c also may distort the shape of the mesh cells 52e to 52g for which the vertex 53c is displaced from a position corresponding to square shapes for the cells 52e, 52g.

In another example, the displaced vertex 53a and vertex 53c may be displaced by a random distance in a random direction, with the distance constrained to be no more than a predetermined range of distances. Thus, the vertex 53a may be constrained to be displaced to a position somewhere inside a circle 54 centered on the location 53b which the vertex 53a would have occupied in the regular square array and having a radius substantially equal to the predetermined maximum distance.

In some examples, the maximum displacement distance can be selected as a proportion of the distance between the vertices 53 in the regular square array. For example, the maximum displacement distance may be less than 0.5 times the distance between the vertices 53 in the regular square array. In one example, the displacement distance may be 0.1 times the distance between the vertices 53.

FIG. 13 shows vertices 53a and 53c displaced from positions that would otherwise produce the regular square array. In other examples, some or all of the vertices in an electrode pattern may be displaced.

Both the distance and direction of displacement of a vertex may be randomly selected. In some examples, the direction of displacement may be randomly selected while the distance of displacement may be a fixed distance. In one example, this fixed distance of displacement may be approximately 0.1 times the spacing of the vertices.

In some examples, the distance of displacement may be varied in relation to the direction of displacement. In other examples, the amount of the variation may be varied based on the geometry of the array of vertices.

In some examples, the direction of displacement may be constrained so that the vertices can be displaced from positions corresponding to regular square shapes.

Although the lines appear as straight lines in the illustration, between vertices, the lines may have any of the sinusoidal shapes as discussed above relative to FIGS. 4-12.

Displacing the vertices of the electrode pattern away from positions in a regular geometric array may reduce the visibility of moiré effects. Such moiré effects may arise from interactions between the repeat length or cell size of an electrode pattern having vertices in a regular array and an element size of elements in a display visible through the touch position sensing panel. Such moiré effects may arise from interactions between the repeat length or cell size of an electrode pattern and a cell size of an LCD display visible through the touch position sensing panel. Moiré effects may produce a repeated pattern across the touch position sensing panel. Such repetitive interference patterns are readily perceived by the human eye.

As the deviation from regularity of a pattern of electrodes increases, the scattering of light increases. For example, Table 1 shows data from a Fast Fourier Transform (FFT) analysis of a mesh having a certain geometry. The FFT determines the number of angles formed by the reflection of light on a cell. As can be seen in the Table, as the randomness of the shape increases, a corresponding increase in angles occurs.

TABLE 1

FFT analysis of geometric shapes

| Shape | Number of angles |
| --- | --- |
| One pixel | 2 |
| Equilateral Diamond | 4 |
| 2 Diamonds of unequal height | 8 |
| 4 diamonds with randomized vertices | 32 |
| one diamond with curved lines | >32 |
| four diamonds with randomized curves | >>32 |

However, the randomization of the lines should be balanced by the increase of the amount of wiring in the electrode due. The increased amount of wiring may cause for less transmittance of light through the panel.

Figure 14:
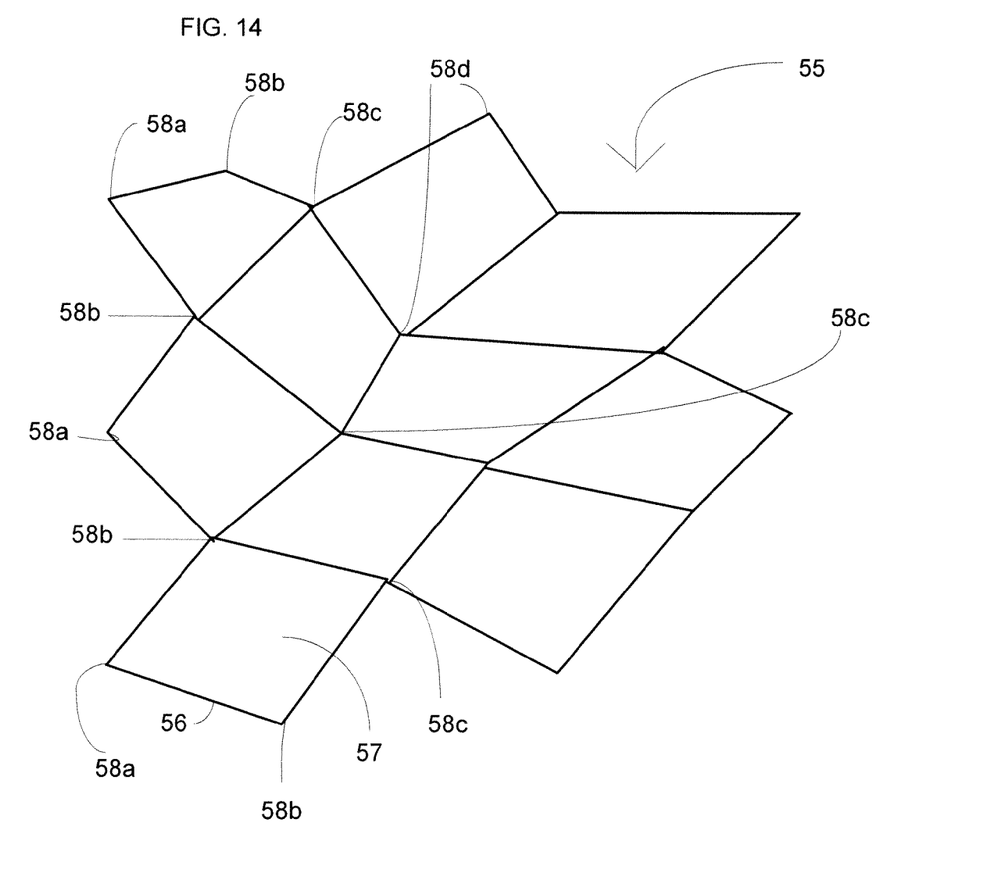
FIG. 14 illustrates schematically another electrode pattern useable in the touch sensitive panel of FIG. 1.

FIG. 14 illustrates a portion of an exemplary electrode pattern 55 which may be used in the touch position-sensing panel 1. The exemplary electrode pattern may be used to form either electrodes 4 (X) and 5 (Y). In the illustrated example, the electrode pattern 55 may be formed by a number of conductive lines 56 arranged to interconnect at connection points to define a conductive grid or mesh pattern made up of an array of mesh cells 57. The connection points of the conductive lines 56 may be the vertices 58a to 58d of the mesh cells 57. In the example, the pattern of the conductive lines 56 and mesh cells 57 may be determined by selecting locations of a first group of vertices 58a. As is shown, the first group of vertices 58a may be uniformly spaced in a straight line. A second group of vertices 58b may then be selected at locations derived from the locations of the first group of vertices in a random manner.

As is shown in FIG. 14, this random selection may be carried out by randomly selecting a distance between each one of the vertices 58a and vertices 58b. Each of vertices 58b may be connected to one of vertices 58a by a conductive metal line 56. Thus, the distances between each one of the vertices 58a and each of the vertices 58b may be random.

The locations of vertices 58c may then be selected by repeating the random selection process based on the locations of vertices 58b. In some examples, the random selection process may be carried out by randomly selecting a distance between each one of the vertices 58b and each of the vertices 58c. Each vertex 58c may be connected to one of the vertices 58b by a conductive metal line 56. Thus, the distances between each one of the vertices 58b and vertices 58c may be random.

This selection process may then be repeated in an iterative manner until all of the selected area of the exemplary electrode pattern 55 has been populated with vertices 58a to 58d interconnected by conductive lines 56.

As a result of this iterative process of selecting locations of the vertices 58a to 58d the mesh cells 57 making up the electrode pattern 55 have random shapes and sizes. In some examples, while the shapes comprising the mesh cells 57 may be random, the variations in the areas of the mesh cells 57 are minimized. For example, the variations in the areas of the mesh cells 57 from a mean mesh cell area of electrode pattern 55 are within 50%.

The randomly selected distances between vertices may be selected from a range having predetermined upper and lower limits. The predetermined upper and lower limits may be set at least in part based on the distances between the already located vertices.

In the illustrated example, the locations of the vertices and the conductive lines may be selected before the conductive lines are formed on the substrate.

In some examples, the conductive lines may be formed of copper with a width in the range approximately 1 µm to approximately 10 µm. In one example, the electrode pattern 10 is arranged so that no more than approximately 5% of the surface of the touch position-sensing panel may be covered by the conductive lines 56.

In FIG. 14, the vertices 58a to 58c may be arranged in a mesh pattern such that each vertex may be connected to four other vertices by four conductive lines 56. The vertices 58a to 58c may be initially arranged in an array of other regular trapezoid shapes. In one example, the vertices 58a to 58c may be arranged to define a mesh pattern such that each vertex is connected to another number of other vertices.

In other examples, different methods of randomly selecting the locations of the vertices may be used.

In some examples, the vertex locations determined by the iterative random selection of vertex locations may be checked to prevent conflicting vertex locations to occur. In some examples, when vertex locations conflict, the random selection process may be repeated until the vertex locations do not conflict. Examples of conflicting vertex locations include two or more vertices having one location, or vertex locations in which the conductive lines linking the vertices cross one another.

In some examples, the electrode pattern 55 may be iteratively defined by starting from one edge of a display or an electrode area and iteratively defining the positions of vertices until another edge of the display or electrode area is reached.

In FIG. 14, the conductive lines defining the electrode pattern may be shown as straight lines for simplicity and to allow easy understanding of the illustrated examples. In other examples, the conductive lines may be shaped according to any of the illustrated examples of FIGS. 4 to 12, either singly or in combination.

In some examples, the electrode patterns produced according to the illustrated examples of FIGS. 13 and 14 may be checked to ensure that the random selection of the vertex locations has not inadvertently resulted in an electrode pattern having linear or periodically repeating elements in the electrode pattern, particularly linear elements extending in a direction which may be horizontal, vertical, or at 45° with respect to an orientation of a display which is to be visible through the touch position sensing panel, and vertices or conductive lines which are too closely spaced. This randomization may prevent interference resulting from positioning of the vertices in relation to the pixels of an LCD.

As discussed regarding the example shown in FIG. 3, a touch position sensing panel may have two electrode layers with respective electrode patterns so that the electrode patterns overlay one another. Any of the examples shown in FIGS. 4 to 14 may be used for either one or both of the electrode layers that may be implemented using narrow metal conductive lines.

In some examples using mesh metal patterns for both electrode layers, the respective electrode patterns of the two electrode layers may be arranged so that the vertices of one of the electrode patterns are positioned at locations substantially corresponding to centers of mesh cells of the other electrode pattern. As a result of this arrangement of the two electrode patterns, the conductive lines of the two electrode patterns may be distributed more evenly across the touch position-sensing panel. In FIGS. 13 and 14, one of the electrode patterns may have vertex locations determined randomly according to the illustrated examples of FIG. 13 or 14. The centroids of area of the mesh cells defined by the randomly determined vertex locations of this one of the electrode patterns may define the locations of the vertices of the other electrode patterns.

For example, the pattern in FIG. 3a may be overlayed with the pattern of FIG. 14, to create a pattern consisting of rhomboid shapes of FIG. 3, the centroids of which are connected by the vertices of the pattern of FIG. 14. Since the connecting lines of FIG. 14 may be generated at the mid point of the lines of FIG. 3, all lines of FIG. 3 run equidistant or in parallel between the lines of FIG. 14 to minimize capacitance. They also intersect at 90 degrees. However, the vertex locations of other electrode patterns may nevertheless be randomly determined, albeit indirectly.

Arranging for vertices of one of the electrode patterns to be positioned at locations substantially corresponding to centers of mesh cells of the other electrode pattern may spread the conductive lines more evenly across the touch position sensing panel, and may reduce visible reductions in display brightness.

In some examples, the respective electrode patterns of the two electrode layers may be arranged so that where conductive lines in the two respective electrode patterns of the two electrode layers cross over one another, the conductive lines cross at an approximately 90° angle. In some examples, it may not be possible to arrange for some conductive lines to cross at a 90° angle and the conductive lines may be arranged to cross at as close to a 90° angle as is practicable. The conductive lines are arranged in curved shapes according to the examples shown in FIGS. 4 to 12. The angle at which conductive lines in the two respective electrode patterns of the two electrode layers cross over may be controlled by adjusting one or more of the wavelength, amplitude and phase of the curved shapes of one or both of the conductive lines.

Arranging for conductive lines in the two respective electrode patterns of the two electrode layers to cross over one another at, or close to, an approximately 90° angle may reduce mutual capacitance between the conductive lines. Arranging for conductive lines in the two respective electrode patterns of the two electrode layers to cross over one another at, or close to, an approximately 90° angle may prevent two closely spaced parallel or oblique lines to be perceived as a single thicker line. Arranging for conductive lines in the two respective electrode patterns of the two electrode layers to cross over one another at, or close to, an approximately 90° angle may spread the conductive lines more evenly across the touch position sensing panel, and may reduce visible reductions in display brightness.

In some examples, the respective electrode patterns of the two electrode layers may be arranged so that where conductive lines in the two respective electrode patterns of the two electrode layers cross over one another the phase and/or width of the conductive lines may be controlled according to the examples shown in FIGS. 9 to 12. The cross over point of conductive lines in the respective electrode patterns of the different electrode layers may be treated in a similar way as a connect.

Reducing the width of the conductive lines in the respective electrode patterns in the two electrode layers where the conductive lines cross over may reduce visible reductions in display brightness at the interconnections. Such reductions in display brightness may be visible where constant width conductive lines cross over as there may be a concentration of conductive metal at the cross over point. Reducing the width of the sinusoidal conductive lines where the sinusoidal conductive lines cross over makes the distribution of the conductive metal across a touch position sensing panel more even, reducing the visibility of differences in display brightness.

The above examples refer to two electrode layers. The above examples could be extended to only one layer, or to three or more electrode layers. If three or more electrode layers are present, the vertices of the electrode patterns of the different layers may be arranged to spread the vertices approximately evenly across the touch position-sensing panel. Placing the vertices of some of the electrode patterns at locations corresponding to centers of mesh cells of other electrode patterns may not be effective for three or more electrode layers.

In some examples where a touch position sensing panel is intended to overlay a display having a set display cell size such as an LCD or LED display, the dimensions of the electrode pattern or patterns used may be selected, at least in part, based upon this set cell size of the display. This may allow visual interactions between the display and the touch position sensing panel to be minimized.

The illustrated examples described above relate to conductor elements and patterns of copper. However, other material may be used. For example, other metals suitable for use as wire pattern material.

The electrodes discussed above may also be incorporated into devices using a self-capacitance drive approach.

Various modifications may be made to the examples described in the foregoing, and any related examples may be applied in numerous applications, some of which have been described herein. It is intended by the following claims to claim any and all applications, modifications and variations that fall within the true scope of the present disclosure.

What is claimed is:

1. An apparatus comprising:
   a first optically clear adhesive (OCA) layer between a first cover sheet and a substrate;
   the substrate, with drive or sense electrodes of a touch sensor disposed on a first surface and a second surface of the substrate, the first surface being opposite the second surface, the drive or sense electrodes being made of a conductive mesh conductive material comprising metal; and
   a display separated from the second surface of the substrate by a second OCA and a second cover sheet such that at least a portion of the second cover sheet is positioned between the second surface of the substrate and the display.

2. The apparatus of claim 1, wherein the conductive material is copper, silver, gold, aluminum, or tin.

3. The apparatus of claim 1, wherein the conductive mesh comprises a plurality of mesh segments, each of the mesh segments having a width of approximately 10 μm.

4. The apparatus of claim 3, wherein approximately 5% of an active area of the touch sensor is covered by the one or more mesh segments.

5. The apparatus of claim 3, wherein each of the mesh segments is substantially sinusoidal.

6. The apparatus of claim 1, wherein the conductive meshes have an optical transmissivity of approximately 90%.

7. The apparatus of claim 1, wherein the sense electrodes being disposed on the first surface of the substrate and the drive electrodes being disposed on the second surface of the substrate.

8. A device comprising:
a first cover sheet;
a first optically clear adhesive layer (OCA) between the first cover sheet and a substrate;
the substrate, with drive or sense electrodes of a touch sensor disposed on a first surface and a second surface of the substrate, the first surface being opposite the second surface, the drive or sense electrodes being made of a conductive mesh conductive material comprising metal;
a display separated from the second surface of the substrate by a second OCA and a second cover sheet such that at least a portion of the second cover sheet is positioned between the second surface of the substrate and the display; and
one or more computer-readable non-transitory storage media embodying logic that is configured when executed to control the touch sensor.

9. The device of claim 8, wherein the conductive material is copper, silver, gold, aluminum, or tin.

10. The device of claim 8, wherein the conductive mesh comprises a plurality of mesh segments, each of the mesh segments having a width of approximately 10 µm.

11. The device of claim 10, wherein approximately 5% of an active area of the touch sensor is covered by the mesh segments.

12. The device of claim 10, wherein each of the mesh segments is substantially sinusoidal.

13. The device of claim 8, wherein the conductive meshes have an optical transmissivity of approximately 90%.

14. The device of claim 8, wherein the sense electrodes being disposed on the first surface of the substrate and the drive electrodes being disposed on the second surface of the substrate.

15. An apparatus comprising:
a first optically clear adhesive (OCA) layer between a first cover sheet and a substrate;
the substrate, with sense electrodes of a touch sensor disposed on a first surface and drive electrodes of the touch sensor disposed on a second surface of the substrate, the first surface being opposite the second surface, the drive and sense electrodes being made of a conductive mesh of conductive material comprising metal; and
a display separated from the second surface of the substrate by a second OCA and a second cover sheet such that at least a portion of the second cover sheet is positioned between the second surface of the substrate and the display.

* * * * *